United States Patent [19]
Song et al.

[11] Patent Number: 5,532,853
[45] Date of Patent: Jul. 2, 1996

[54] REPARABLE DISPLAY DEVICE MATRIX FOR REPAIRING THE ELECTRICAL CONNECTION OF A BONDING PAD TO ITS ASSOCIATED SIGNAL LINE

[75] Inventors: Jun-ho Song; Yong-Gug Pae, both of Kyungki-do; Wun-yong Park, Seoul, all of Rep. of Korea

[73] Assignee: Samsung Electronics Co., Ltd., Suwon, Rep. of Korea

[21] Appl. No.: 205,299

[22] Filed: Feb. 3, 1994

[30] Foreign Application Priority Data

Mar. 4, 1993 [KR] Rep. of Korea .................. 93-3209

[51] Int. Cl.⁶ .................. G02F 1/1333; G02F 1/1345; H01L 21/26; H01L 21/268
[52] U.S. Cl. .................. 359/87; 359/88; 437/173; 437/923
[58] Field of Search .................. 359/88, 87; 148/DIG. 92; 437/906, 923, 173; 257/59, 72

[56] References Cited

U.S. PATENT DOCUMENTS

| | | | |
|---|---|---|---|
| 4,259,367 | 3/1981 | Dougherty, Jr. | 437/923 |
| 4,752,118 | 6/1988 | Johnson | 359/87 |
| 4,807,973 | 2/1989 | Kawasaki | 359/55 |
| 5,086,347 | 2/1992 | Ukai et al. | 359/87 |
| 5,303,074 | 4/1994 | Salisbury | 359/59 |
| 5,475,246 | 12/1995 | Wei et al. | 257/59 |

*Primary Examiner*—Anita Pellman Gross
*Assistant Examiner*—Walter J. Malinowski

[57] ABSTRACT

A display device matrix comprising a plurality of aluminum scanning line electrodes and a plurality of associated chromium bonding pads, wherein each scanning line electrode has an associated repairing conductive layer which can connected the scanning line electrode with its associated bonding pad should a connection failure otherwise prevent electrical connection between the two.

19 Claims, 14 Drawing Sheets

REPARABLE DISPLAY DEVICE MATRIX FOR REPAIRING THE ELECTRICAL CONNECTION OF A BONDING PAD TO ITS ASSOCIATED SIGNAL LINE

BACKGROUND OF THE INVENTION

The present invention relates to a display device matrix, and more particularly, to a Liquid Crystal Display (LCD) panel matrix wherein the electrical connection between respective scanning line electrodes and bonding pads can be repaired to increase matrix yield and improve display device image quality.

An LCD panel displays data using a plurality of display cells optically actuated or switched by a matrix of signal lines. That is, specifically identified portions of the liquid crystal, i.e., pixels, are defined and operated by two sets of signal lines, data line electrodes and scanning line electrodes, orthogonally disposed in a matrix pattern.

Figure 1:
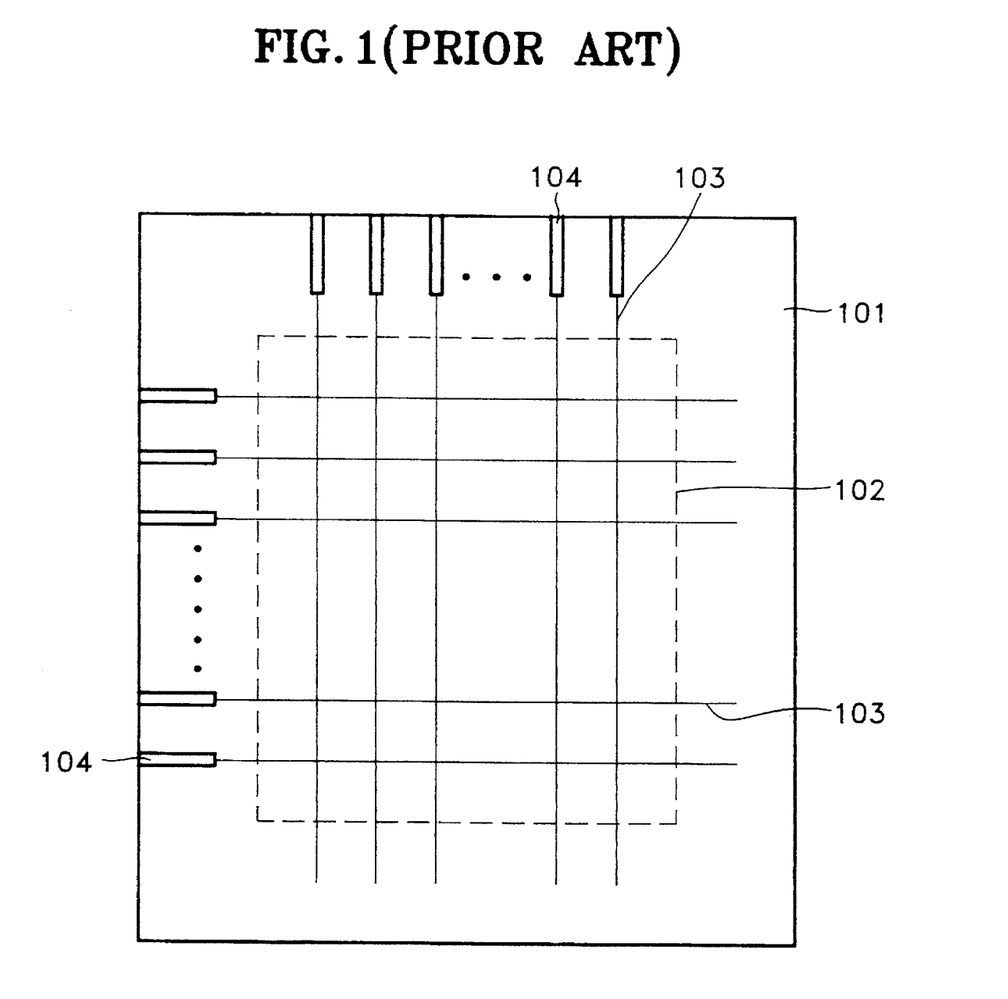
FIG. 1 is a schematic diagram of a conventional matrix display device.

FIG. 1 is a schematic diagram of a conventional LCD panel including a substrate 101, a pixel portion 102, signal lines 103 and bonding pads 104. Signal lines 103 are disposed in a matrix pattern, and switching elements such as thin film transistors or diodes are disposed at the respective intersecting points. Signal lines 103 are generally composed of metal, such as aluminum, having a very low resistivity.

Low resistivity signal lines inhibits deterioration of liquid crystal image quality due to the signal delay. Scanning line electrodes exhibit a distinct RC time delay due to the gate and line capacitance. Signal delay becomes more pronounced as an LCD panel increases in size. Thus, aluminum signal lines having low resistivity are generally mandatory for large size LCD panels in order to avoid excessive signal delay and the resulting deterioration in image quality.

Figure 2:
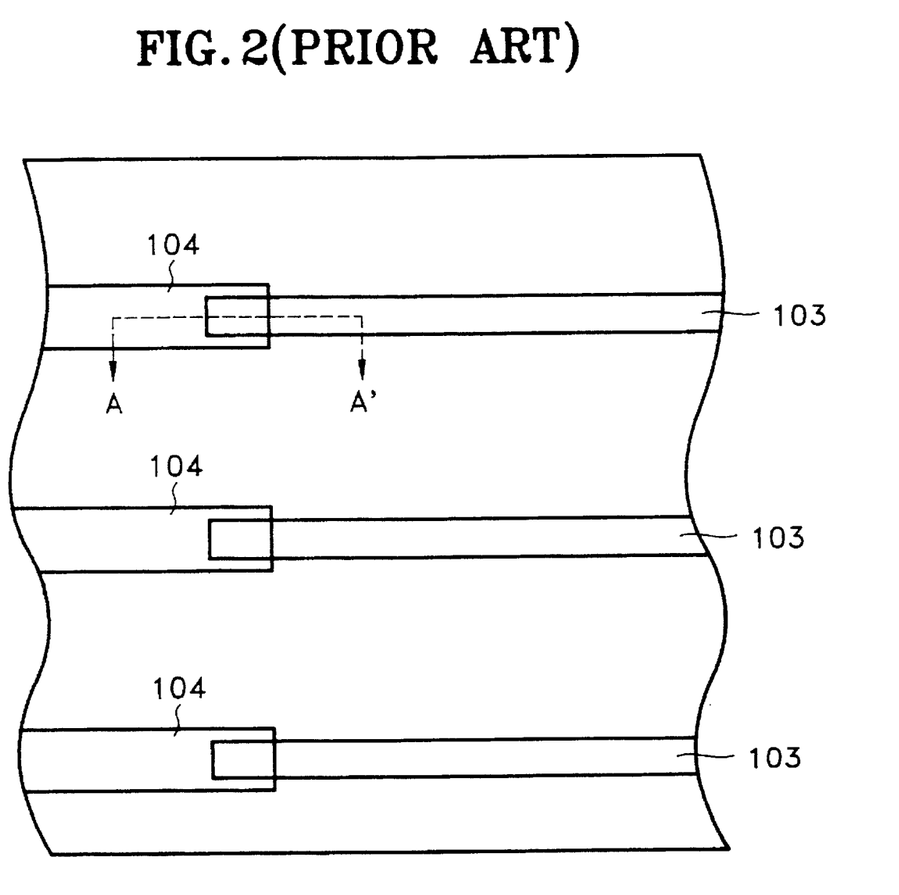
FIG. 2 is a plan view illustrating a connection portion of bonding pads and signal lines shown in FIG. 1.

Unfortunately, aluminum has a low pressure-resistance property which generally means that a substantial portion of aluminum gate must be used as a bonding pad. Thus, as shown in FIG. 2, respective bonding pads 104 composed of a metal other than aluminum, such as, for example, chromium, having a high pressure-resistance property are coupled to respective signal lines 103.

Figure 3:
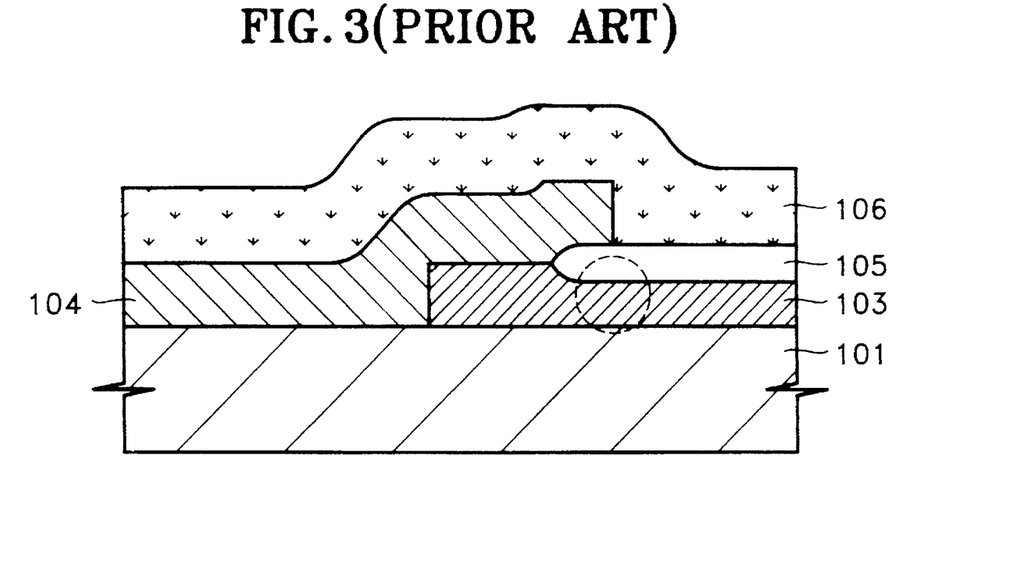
FIG. 3 is a cross-sectional view taken along a line AA' shown in FIG. 2.

A detailed description of the bonding pad 104 to signal line 103 connection will be made with reference to FIG. 3 which illustrates a cross-sectional view taken along line AA' of the structure shown in FIG. 2. In FIG. 3, signal line 103 is formed on a transparent glass substrate 101. An oxide film 105 is formed by anode oxidation over signal line 103, except at an end portion of signal line 103. Bonding pad 104 is formed over and electrically coupled to the end portion of signal line 103. An insulating layer 106 is then formed over bonding pad 104 and oxide film 105. In this arrangement, oxide film 105 prevents the formation of hillocks and pin holes in signal line 103. Insulating layer 106 is typically composed of a material like silicon nitride having a multi-layer structure such that it provides improved etching-prevention and excellent insulating characteristics.

Unfortunately, a variety of mishaps may result in a connection failure between bonding pad 104 and signal line 103. A connection failure may result from a step coverage defect, from a heat stress difference between bonding pad 104 and signal line 103 during a subsequent processing step, or from corrosion of signal line 103 by etchant infiltrating through oxide film 105. Connection failures reduce the pixel yield in the display device matrix and generally reduce image quality.

U.S. Pat. No. 4,807,973 proposes an LCD panel having a repair ring as a means by which the above-described problem can be remedied. However, this remedy increases the overall size of the LCD panel and signals transferred via a repair ring are unduly delayed. Furthermore, the number of connection defects which can be repaired by the repair ring is small. Thus, a satisfactory repair mechanism for connection failures in a large LCD panel matrix does not yet exist.

SUMMARY OF THE INVENTION

It is, therefore, an object of the present invention is to provide an LCD panel wherein matrix connection failures between bonding pads and signal lines can be easily repaired.

Another object of the present invention is to provide an LCD panel having an increased matrix pixel yield, and an ability to repair signal line connection failures in the matrix.

Yet another object of the present invention is to provide an LDC panel having an improved matrix which allows the repair of connection failures without unduly increasing the size of the LCD panel or delaying signals.

To accomplish the above objects, the display device matrix according to the present invention comprises a display device matrix having a substrate, a plurality of signal lines disposed on the substrate in a matrix pattern, a plurality of bonding pads formed on the substrate, each bonding pad having one end coupled to a respective signal line, such that an electrical junction is formed between each bonding pad and a respective signal lines, a first insulating layer formed over the plurality of signal lines and the plurality of bonding pads, and a plurality of repairing conductive layers formed on the first insulating layer over a respective electrical junctions, such that a first end portion of each repairing conductive layer overlays a portion of an associated signal line, and another end portion of each repairing conductive layer overlays a portion of an associated bonding pad.

In another aspect, the present invention comprises a display device matrix having a plurality of display cells and including a substrate, a plurality of scanning line electrodes formed on said substrate, each one of the plurality of scanning line electrodes corresponding to a respective one of the plurality of display cells and including, a plurality of gate portions, each gate portion receiving a scanning signal and corresponding to a respective one of the plurality of display cells, a plurality of additional capacitance portions, each additional capacitance portion corresponding to a respective one of the plurality of display cells, and at least one connection portion disposed between adjacent additional capacitance portions. The matrix further comprising a first insulating layer formed over the plurality of scanning line electrodes, a plurality of pixel electrodes formed on the first insulating layer and arranged in a matrix such that each pixel electrode corresponds to a respective display cell, each pixel electrode having an edge portion overlaying a predetermined portion of an additional capacitance portion of a selected scanning line electrodes, a plurality of data line electrodes formed on the first insulating layer, wherein each data line electrode corresponds to a scanning line electrode and includes a plurality of drain portions, and a plurality of connection portions connecting adjacent drain portions, and a plurality of source regions, each source region being electrically coupled to a respective pixel electrodes and to a corresponding drain portion of one of the plurality of data line electrodes.

BRIEF DESCRIPTION OF THE DRAWINGS

The above objects and other advantages of the present invention will become more apparent upon review of the following detailed description of preferred embodiments made with reference to the attached drawings in which:

FIGS. 5A through 5C illustrate examples of cross-sectional views taken along the line BB' shown in FIG. 4;

DETAILED DESCRIPTION OF THE INVENTION

Figure 4:
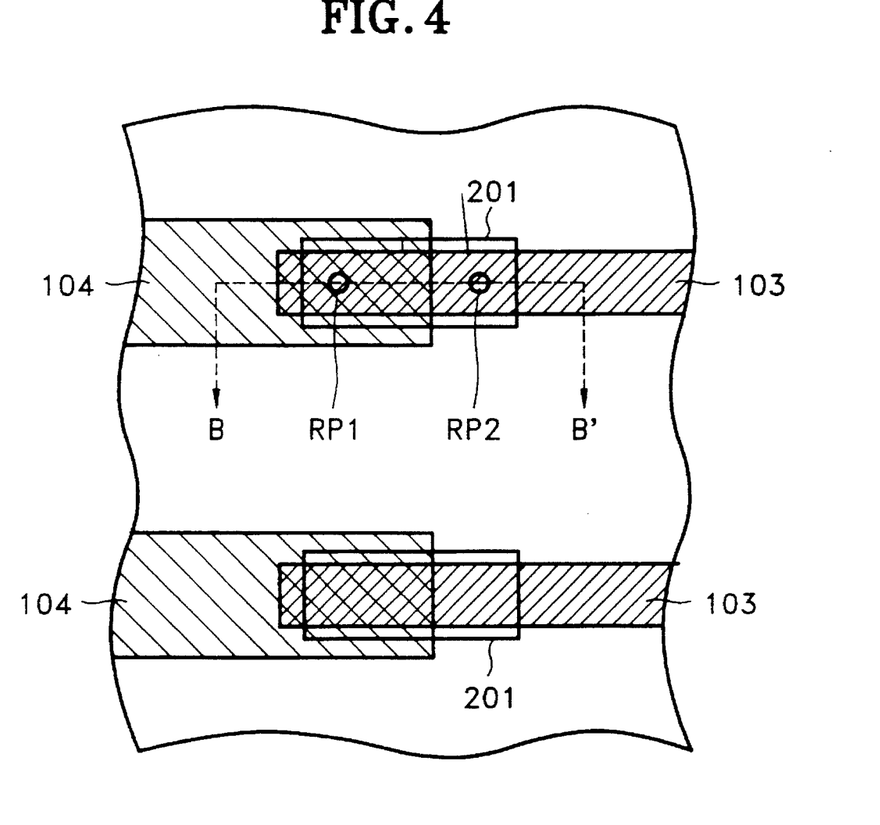
FIG. 4 is a partial plan view of the matrix display device according to an embodiment of the present invention.
Figure 5A:
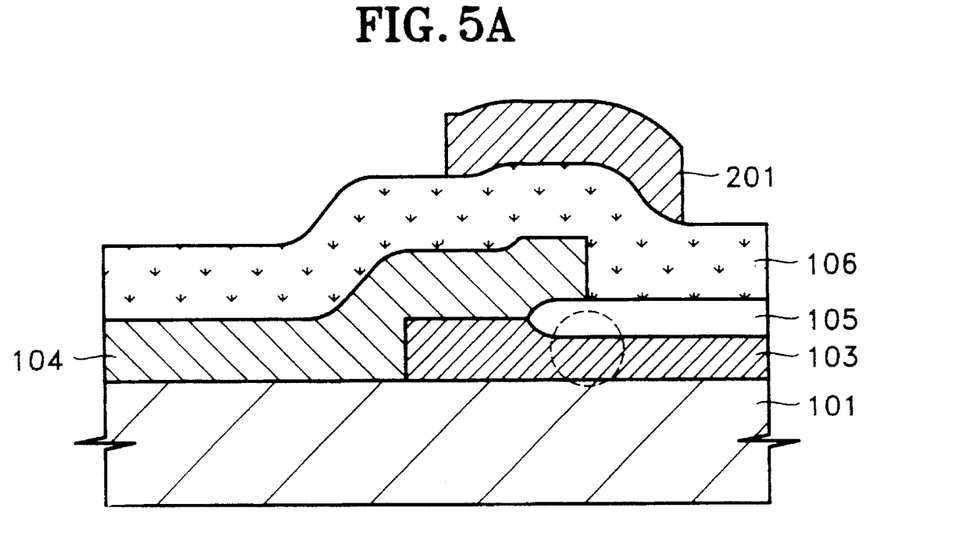
FIG. 5A illustrates an example of no defect.

Referring to FIG. 4, the present invention includes a repairing conductive layer 201 formed over the connection point between signal line 103 and bonding pad 104. One end of repairing conductive layer 201 extends over signal line 103 and the other end thereof extends over bonding pad 104. As shown in FIG. 5A, repairing conductive layer 201 is insulated from signal line 103 and bonding pad 104 by an insulating layer 106.

In FIG. 5A, signal line 103 is formed on a transparent glass substrate 101, and oxide film 105 is formed over signal line 103, except at the respective end portions, one of which is shown in FIG. 5A. The respective end portions are connected to respective bonding pads 104 on either side of the matrix. In the example shown in FIG. 5A, bonding pad 104 is formed to extend over the portion of signal line 103 not covered by oxide film 105 to thereby electrically couple with signal line 103. An insulating layer 106 such as a silicon nitride ($SiN_x$) is then formed over the entire surface of bonding pad 104 and oxide film 105.

In the present example, signal line 103 can be made of aluminum (Al) having a low resistivity and excellent adhesiveness with respect to substrate 101. Bonding pad 104 can be made of chromium (Cr) having excellent pressure-resistance properties. Oxide film 105 can be easily formed of aluminum oxide ($Al_2O_3$), or similar metal oxide, by oxidizing the exposed surface of signal line 103. Oxide film 105 prevents the generation of hillocks and pin holes in signal line 103, thereby reducing the risk of signal line electrical failure.

In the present example, if signal line 103 corresponds to a gate line, i.e., a scanning line electrode, of a reverse-stagger type TFT LCD, then oxide film 105 and insulating layer 106 correspond to a two-layer gate insulating layer. Repairing conductive layer 201 may be simultaneously formed in the conventional process of forming the source/drain electrodes of the TFT. Alternatively, insulating layer 106 may form a multi-layer structure composed of a gate insulating layer and a protective insulating layer formed on the source/drain electrodes of the TFTs in the LCD panel.

In either case, repairing conductive layer 201 having one end extending over signal line 103 and another end extending over bonding pad 104, is formed on insulating layer 106. Repairing conductive layer 201 is preferably made of metal such as chromium.

Figure 5B:
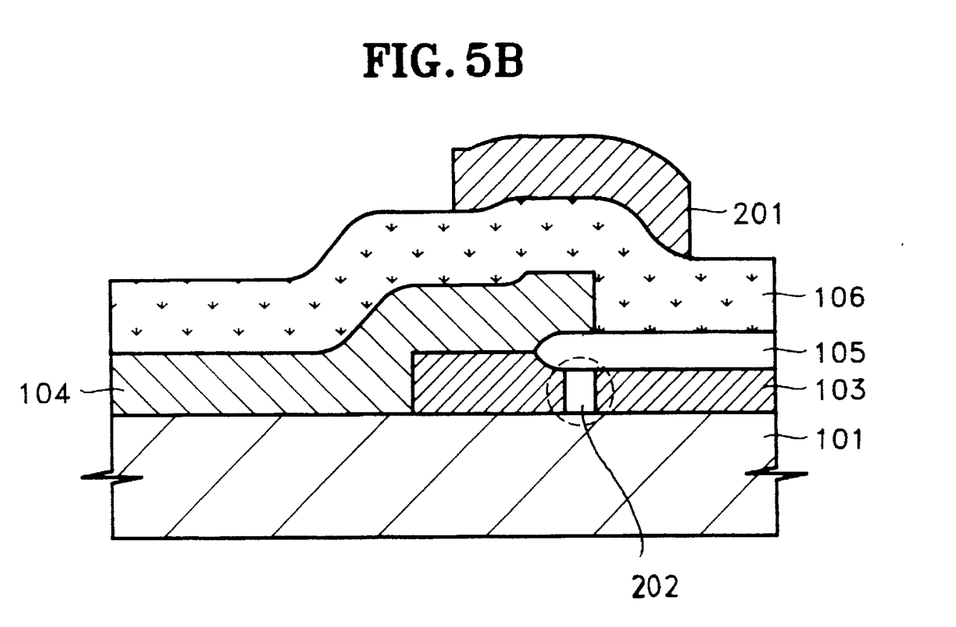
FIG. 5B illustrates an example of a signal line defect.

As described above and as shown in FIG. 5B, aluminum signal line 103, which has low pressure-resistance properties, may be formed (or deformed during subsequent processing steps) such that it contains a connection failure defect 202 between the overlapping portion of bonding pad 104 and the remaining length of the signal line 103. The present invention can remedy such connection failure defects in the following manner.

Figure 5C:
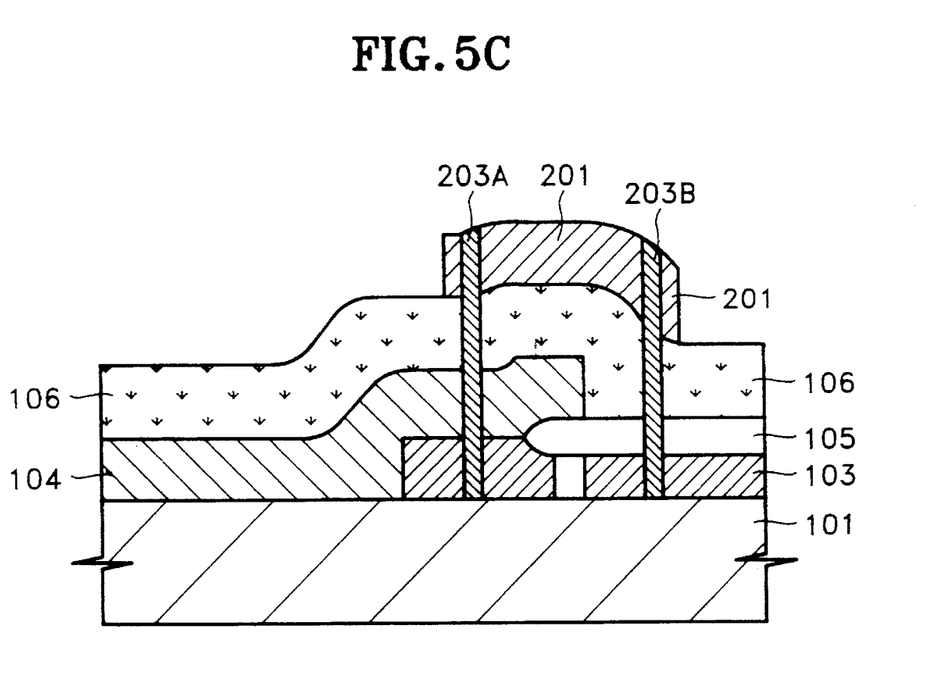
FIG. 5C illustrates an example of a repaired signal line defect.

Once a connection failure defect 202 is detected in signal line 103, a laser beam having predetermined energy and wavelength is applied to repair points $RP_1$ and $RP_2$, shown in FIG. 4. Upon application of the laser beam, insulating layer 106 and metal oxide layer 105 are selectively removed to form contact holes. Metal from repairing conductive layer 201, bonding pad 104, and signal line 103 are melted by the laser beam and plastically deform to mutually couple within the contact holes. As shown in FIG. 5C, the foregoing process results in the construction of repairing connections 203A and 203B which electrically couple bonding pad 104 with signal line 103 through repairing conductive layer 201.

Figure 6:
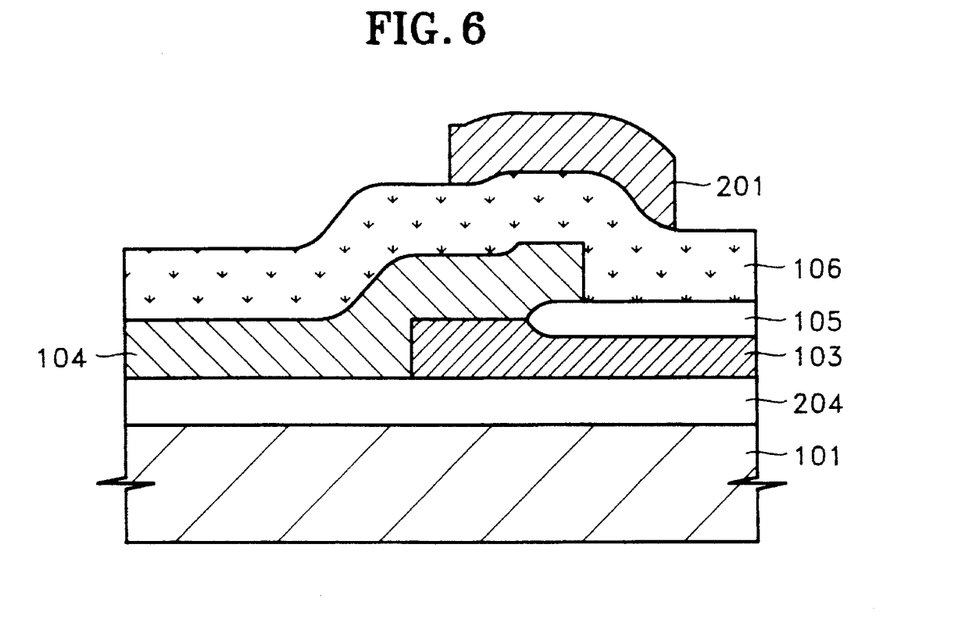
FIG. 6 shows another embodiment of the cross-sectional view along a line BB' shown in FIG. 4.

FIG. 6 is a cross-sectional view taken along line BB' in FIG. 4 illustrating another embodiment of the present invention. In this embodiment, an insulating layer 204 is formed between bonding pad 104/signal lines 103 and substrate 101. In FIG. 6, signal line 103 corresponds to a respective data electrode and insulating layer 204 corresponds to the gate insulating layer of LCD panel. Insulating layer 106 corresponds to a protective insulating layer formed on the source/drain electrodes of LCD panel.

Figure 7:
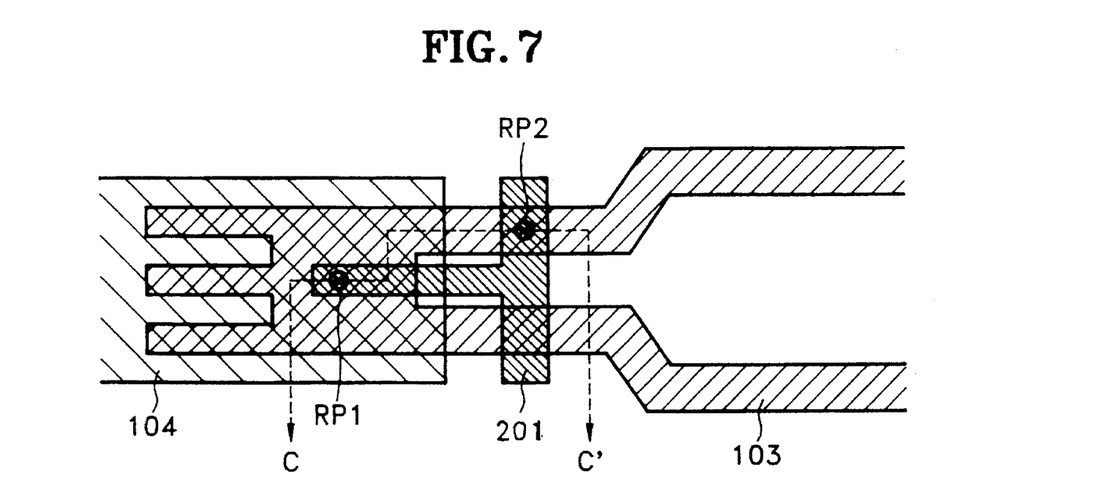
FIG. 7 is a partial plan view of the display device matrix according to another embodiment of the present invention.

FIG. 7 is a partial plan view of another embodiment of a display device matrix according to the present invention. In FIG. 7, the end portion of each signal line 103 is divided into several fork-shaped prongs. This structure improves the connection properties between bonding pad 104 and signal line 103. The portion of signal line 103 extending to pixel portion 102 has twin signal path branches to provide duplication of respective data electrodes for purposes described below. In the foregoing structure, repairing conductive layer 201 is T-shaped having a head portion extending over the twin signal line branches, and the bottom portion extending over bonding pad 104.

Figure 8:
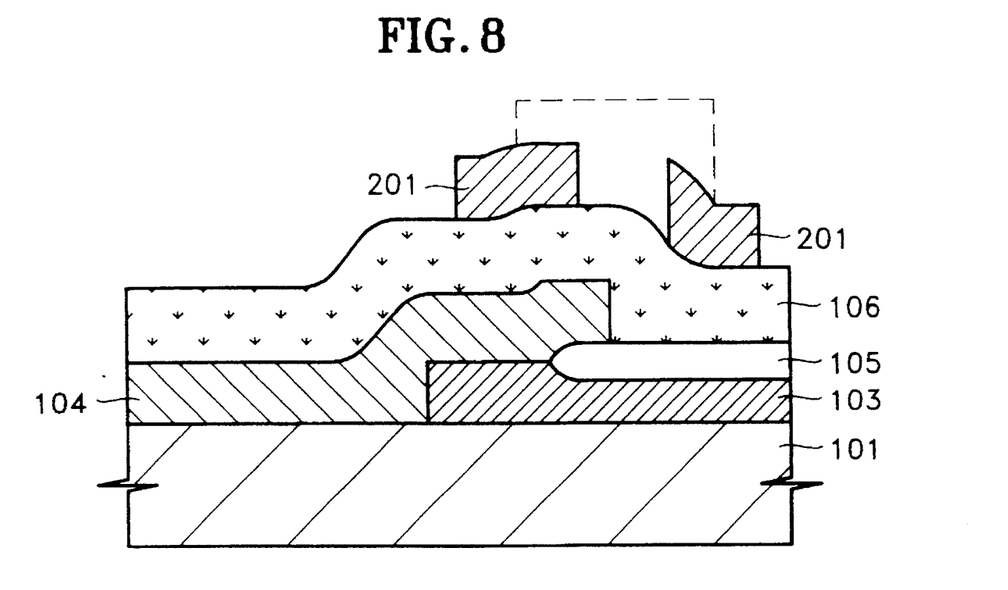
FIG. 8 shows a cross-sectional view taken along line CC' in FIG. 7.
Figure 9:
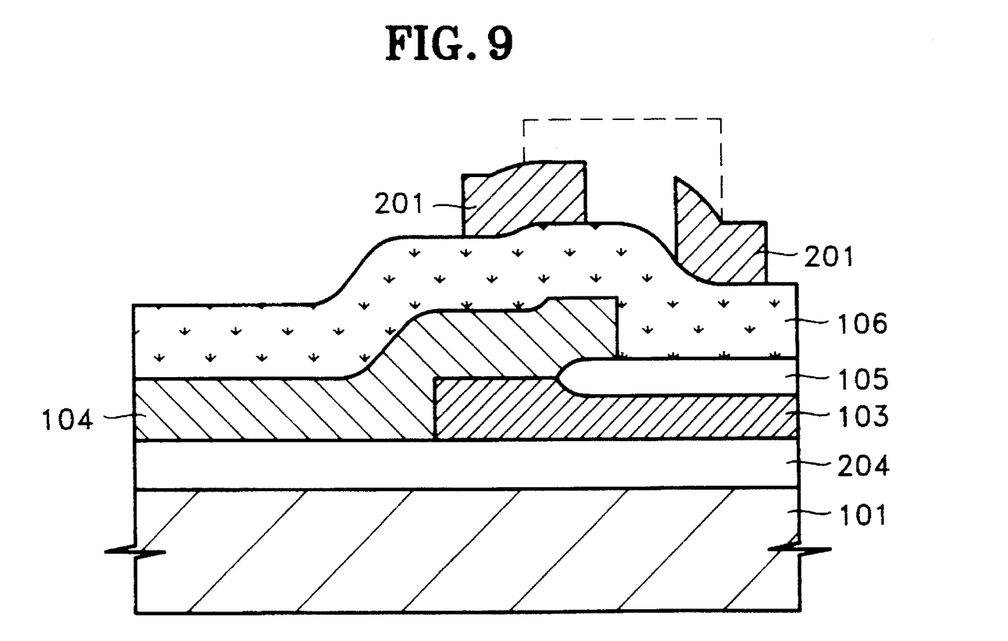
FIG. 9 shows another cross-sectional view taken along line CC' in FIG. 7.

FIGS. 8 and 9 are cross-sectional views taken along line CC' in FIG. 7 which illustrate separate embodiments of the present invention. The dashed lines in FIGS. 8 and 9 indicate the T-structure connection which exists between the two sections of repairing conductive layer 201, but which can not be seen in the respective cross-sectional views. The structure shown in FIG. 9 differs from the structure in FIG. 8 by the addition of insulating layer 204.

In FIGS. 8 and 9, repairing conductive layer 201 is insulated from bonding pad 104 and signal line 103 by insulating layer 106. However, if a connection failure defect in signal line 103 is detected, then the process described above is repeated by which a laser beam is applied to repair points $RP_1$ and $RP_2$ shown in FIG. 7. Contact holes are thus formed in insulating layer 106 and oxide film 105, and melted metal from bonding pad 104, signal line 103, and repairing conductive layer 201 plastically deforms to mutually couple within the contact holes. In this manner, bonding pad 104 is electrically coupled with signal line 103 through repairing conductive layer 201.

Figure 10:
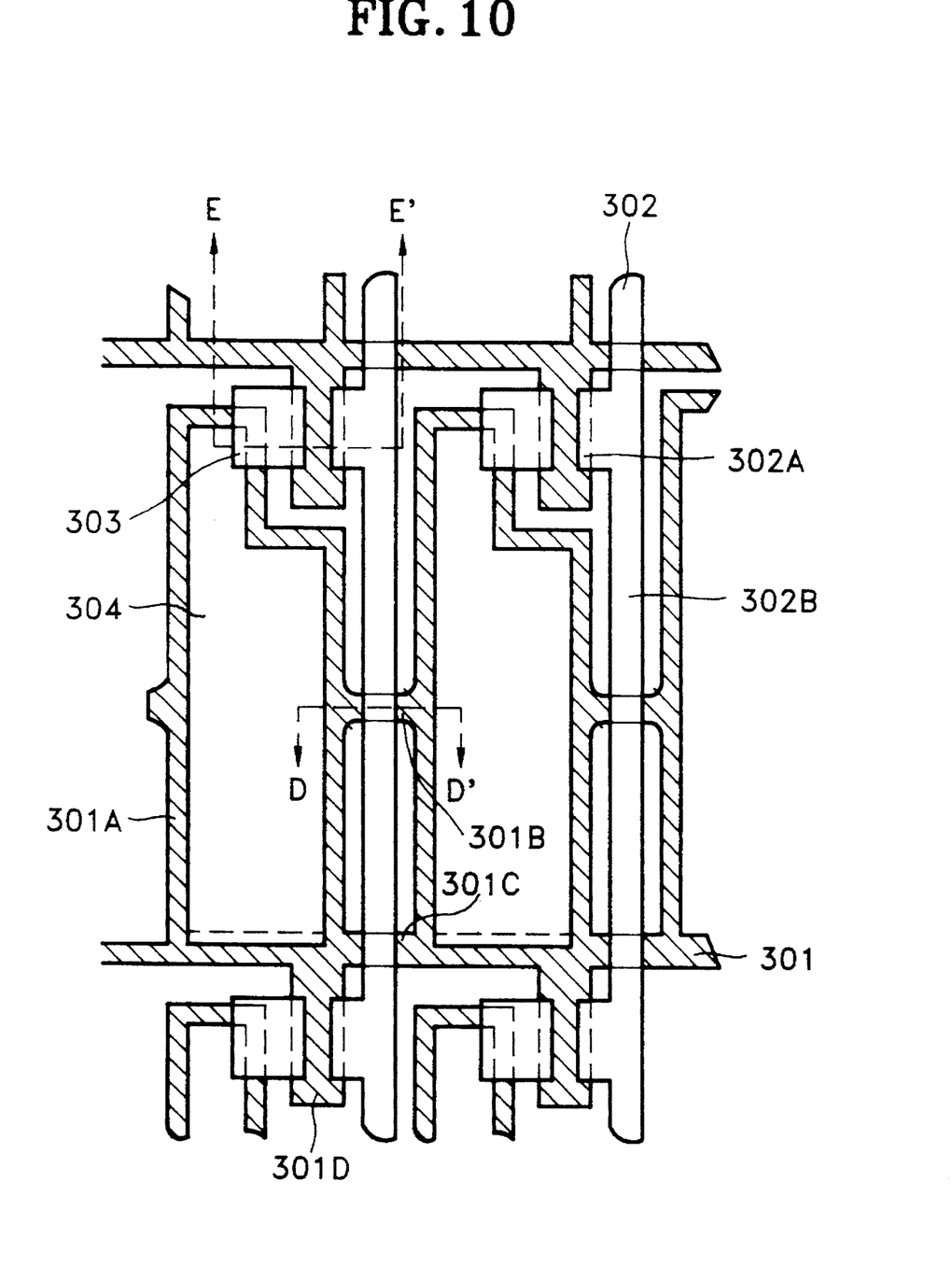
FIG. 10 is a partial plan view of the display device matrix according to yet another embodiment of the present invention.

FIG. 10 is a partial plan view of yet another embodiment of the display device matrix according to the present invention. In particular, FIG. 10 schematically illustrates the structure relationship between a data line electrode and a scanning line, or gate line, electrode.

Referring to FIG. 10, data line electrode 302 extends perpendicular to scanning line electrode 301. Data line electrode 302 includes a drain electrode portion 302A and connection portion 302B disposed between adjacent drain electrode portions. In a display device matrix incorporating presently preferred line driving schemes, data line electrode 302 is typically disposed in a vertical direction relative to a horizontally disposed scanning line electrode 301.

Individual pixels in a display panel matrix are defined by a respective pixel electrode 304, a plurality of which are disposed in a matrix pattern. The liquid crystal corresponding to a pixel is "driven" by the potential difference between the pixel electrode and a common electrode formed on an opposing plate, usually the glass plate. A transistor which switches the voltage potential of the one pixel is composed of a gate portion 301D of scanning line electrode 301, a source electrode 303, and drain electrode portion 302A of data line electrode 302. Source electrode 303 is coupled to the pixel electrode 304.

With this structure, the switching operation of the transistor is controlled by a scanning signal applied by scanning line electrode 301. When the scanning signal is applied and the transistor is "on," the signal apparent on the data line is transferred to the corresponding pixel electrode. The time period during which data is maintained in each pixel is determined by the inherent capacitances of the liquid crystal used in the display panel and the capacitance of pixel electrode 304.

Each of scanning line electrode 301 applies an respective scanning signal. Scanning electrode 301 includes additional capacitance portion 301a, gate portion 301D, and connection portions 301B and 301C. Additional capacitance portion 301A is formed over the periphery of the pixel in the adjacent line. Gate portion 301D serves as the gate for the corresponding pixel transistor.

Duplication of the scanning signal path is achieved by, at least, twin connection portions (or branches) 301B and 301C. Pixel electrode 304 is insulated from the scanning line electrode 301 by an insulating layer, but an edge of pixel electrode 304 overlaps the additional capacitance portion 301A of scanning line electrode 301. Additional capacitance portion 301A and gate portion 301D belong to different scanning lines. Thus, the effective driving time for the pixel is increased, which results in improving image quality. Also, the twin scanning line signal portions 301B and 301C provide duplicate signal paths which create a fail-safe effect.

Figure 11:
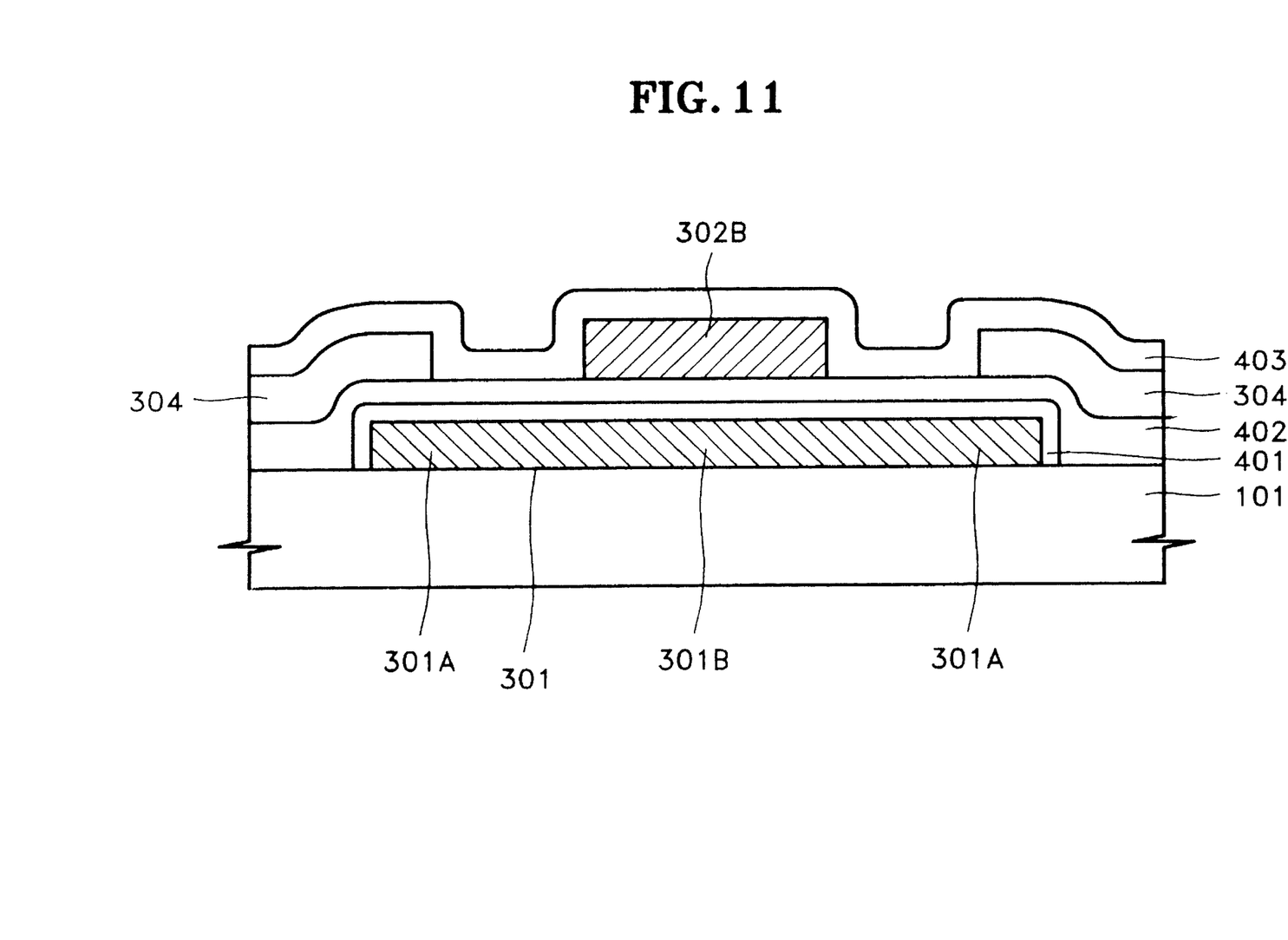
FIG. 11 shows a cross-sectional view taken along a line DD' in FIG. 10.

The scanning line electrode 301 or the data electrode 302 shown in FIG. 10 corresponds with the signal line 103 embodiments explained with reference to FIGS. 5 through 9. FIG. 11 is a cross-sectional view taken along line DD' in FIG. 10 and illustrates still another embodiment of the present invention.

Referring to FIG. 11, scanning line electrode 301 is formed on a transparent substrate 101 and an insulating layer 402 is formed over scanning line electrode 301. Scanning line electrode 301 is made of metal having a very low resistance such as aluminum, insulating layer 402 is made of a conventional material having excellent insulating properties and sufficient firmness. A metal oxide film 401 is formed on scanning line electrode 301 by anodic oxidation so as to improves insulation.

Pixel electrode 304 is formed over insulating layer 402, overlapping the additional capacitance portion 301A of scanning line electrode 301. Data line connection portion 302B is formed, intersecting with the scanning line electrode connection portion 301B. A protective layer 403 of silicon nitride is formed over the entire surface the resulting structure.

Figure 12:
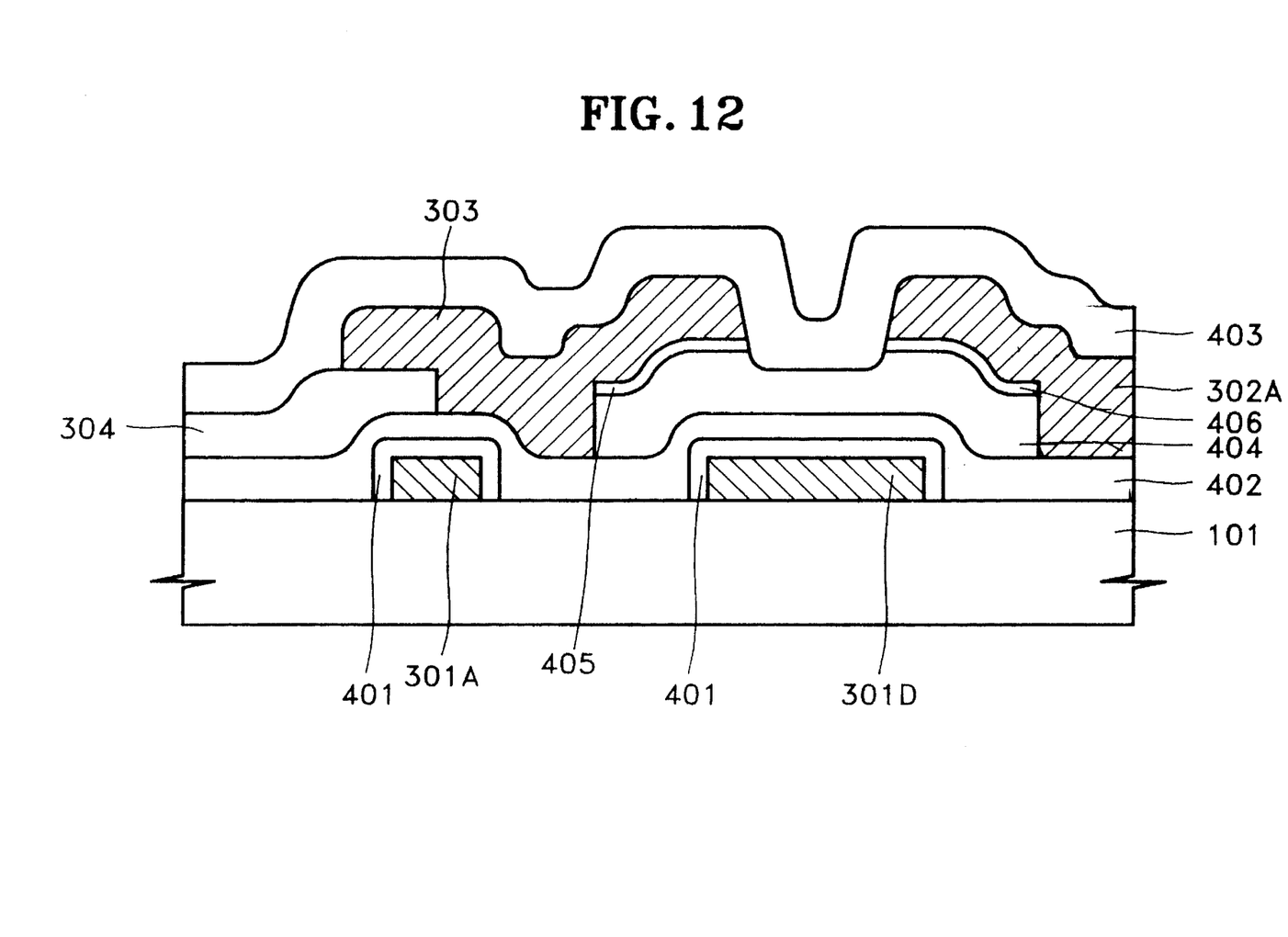
FIG. 12 shows another cross-sectional view taken along line EE' in FIG. 10.

FIG. 12 is a cross-sectional view taken along line EE' in FIG. 10 and illustrates still another embodiment of the present invention.

Referring to FIG. 12, scanning line electrode 301 having additional capacitance portion 301A and gate portion 301D is formed on a substrate 101. Oxide film 401 is formed on the surface of the scanning line electrode 301. Scanning line electrode 301 can be made of aluminum and oxide film 401 can be made of aluminum oxide ($Al_2O_3$). An insulating layer 402 such as silicon nitride ($SiN_x$) is formed on the oxide film 401, and a semiconductor layer 404 is selectively formed on insulating layer 402. Semiconductor layer 404 is disposed over the gate portion 301D of scanning line electrode 301. Source/drain regions and the corresponding channel region for a transistor are formed in the amorphous silicon semiconductor layer 404.

In the structure shown in FIG. 12, pixel electrode 304 is formed on insulating layer 402 such that one end overlaps the additional capacitance portion 301A of the scanning line electrode 301. In the upper portion of the source and drain regions of semiconductor layer 404, a source connection region 405 and a drain connection region 406 are formed by doping the respective areas with impurities in high concentration to form ohmic contacts. Source electrode portion 303 is coupled to pixel electrode 304, and protective layer 403 is formed on the surface of the source electrode portion 303 and drain electrode portion 302A.

Figure 13:
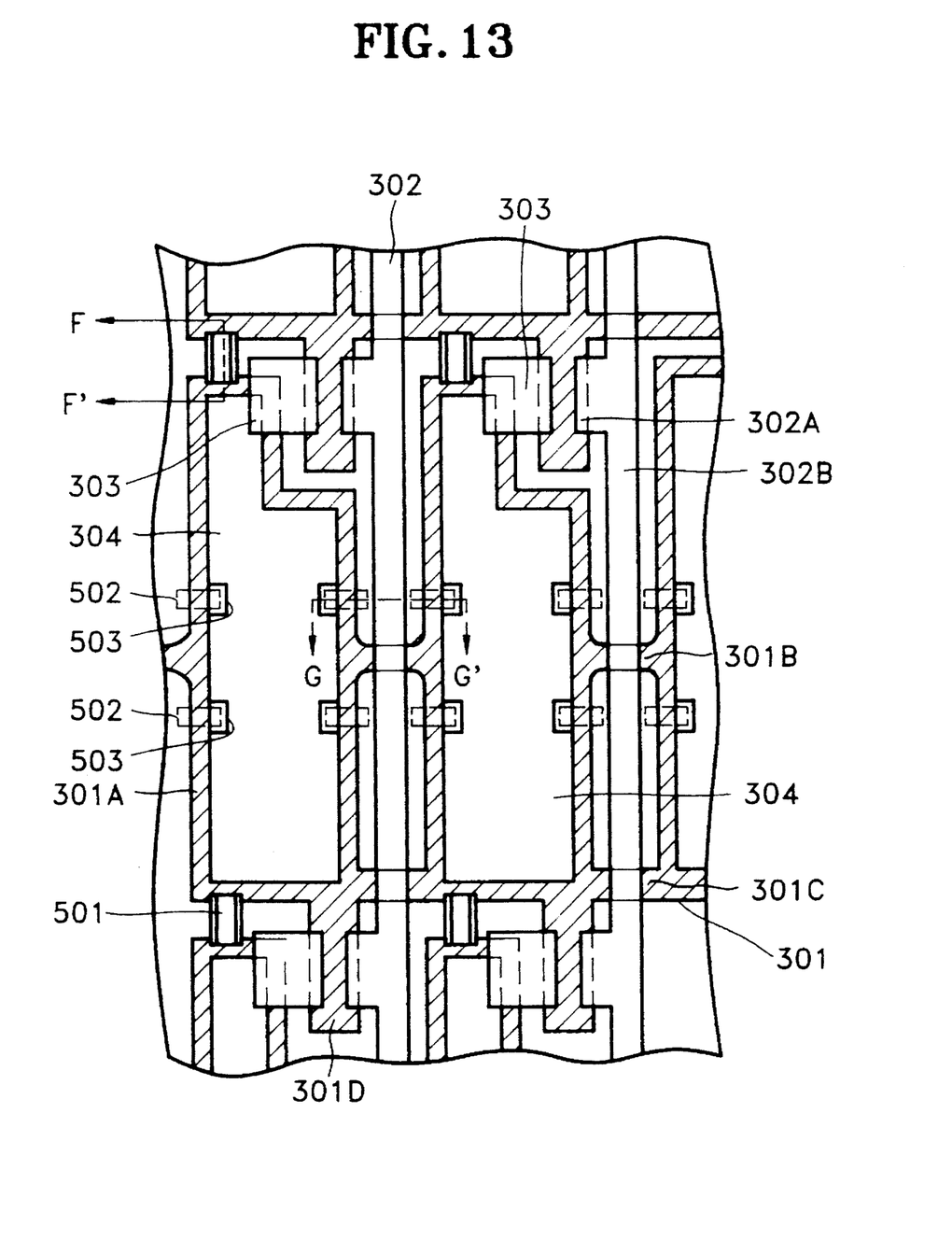
FIG. 13 is a partial plan view of the display device matrix according to still another embodiment of the present invention.

FIG. 13 is a partial plan view of still another embodiment of the display device matrix according to the present invention. In FIG. 13, each data line electrode 302 includes a drain electrode portion 302A and connection portion 302B. Furthermore, each scanning line electrode 301 includes an additional capacitance portion 301A, gate portion 301D, and connection portions 301B and 301C. Pixel electrode 304 is insulated from scanning line electrode 301 by an insulating layer, and the periphery of pixel electrode 304 overlaps part of additional capacitance portion 301A.

Additionally, multiple destruction-prevention notches 503 are formed in pixel electrode 304 adjacent to connection portion 301B. Additional capacitance portion 301A of the scanning line electrode 301 is disposed adjacent to the destruction-prevention notches 503, and may be selectively disconnected by use of a laser beam, should a connection failure defect be detected in the adjacent scanning line electrode 301.

Figure 14:
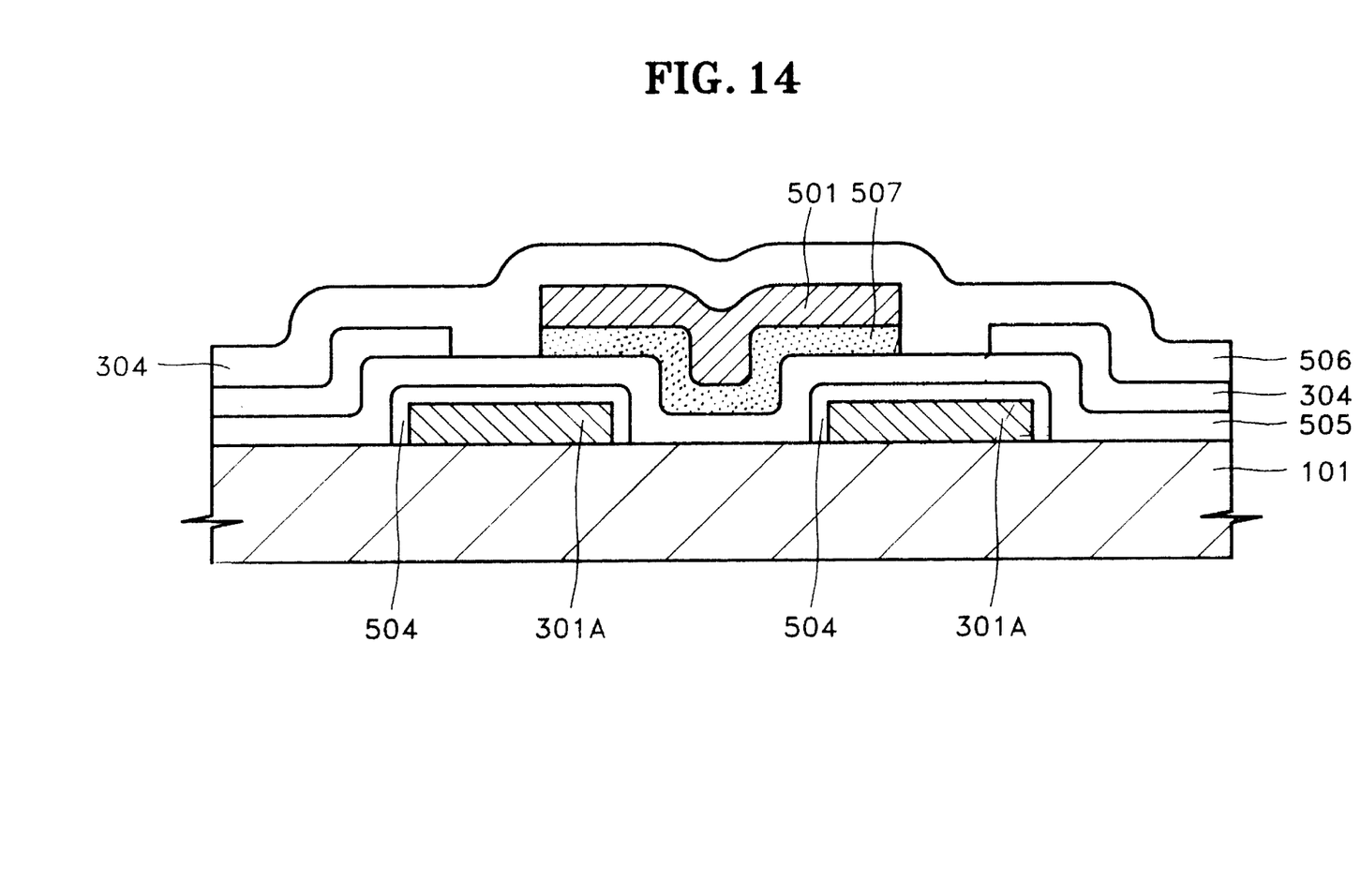
FIG. 14 shows a cross-sectional view taken along line FF' in FIG. 13.

As shown in the cross-sectional view of FIG. 14, scanning line electrode repairing conductive layer 501 is formed over two additional capacitance portions 301. These two additional capacitance portions 301 are adjacent to one another, oriented in the direction of the data line electrode, and separated by an insulating layer 505.

The scanning line electrode repairing conductive layer 501 may be electrically coupled to either scanning line electrode 301 by use of a laser beam, when a connection failure defect is detected in either scanning line electrodes 301. Furthermore, in those instances wherein a scanning electrode 301 does not have a defect, the corresponding destruction-prevention notches 502 may be selectively disconnected allowing the scanning electrodes 301 having no defect to serve as a signal path, rather than the scanning line electrode having the connection failure defect. In other words, the display device matrix shown in FIG. 13 provides a scanning line electrode 301 having at least two signal paths. If a defect is detected for one path, the adjacent path be selected over the defective one.

Figure 16:
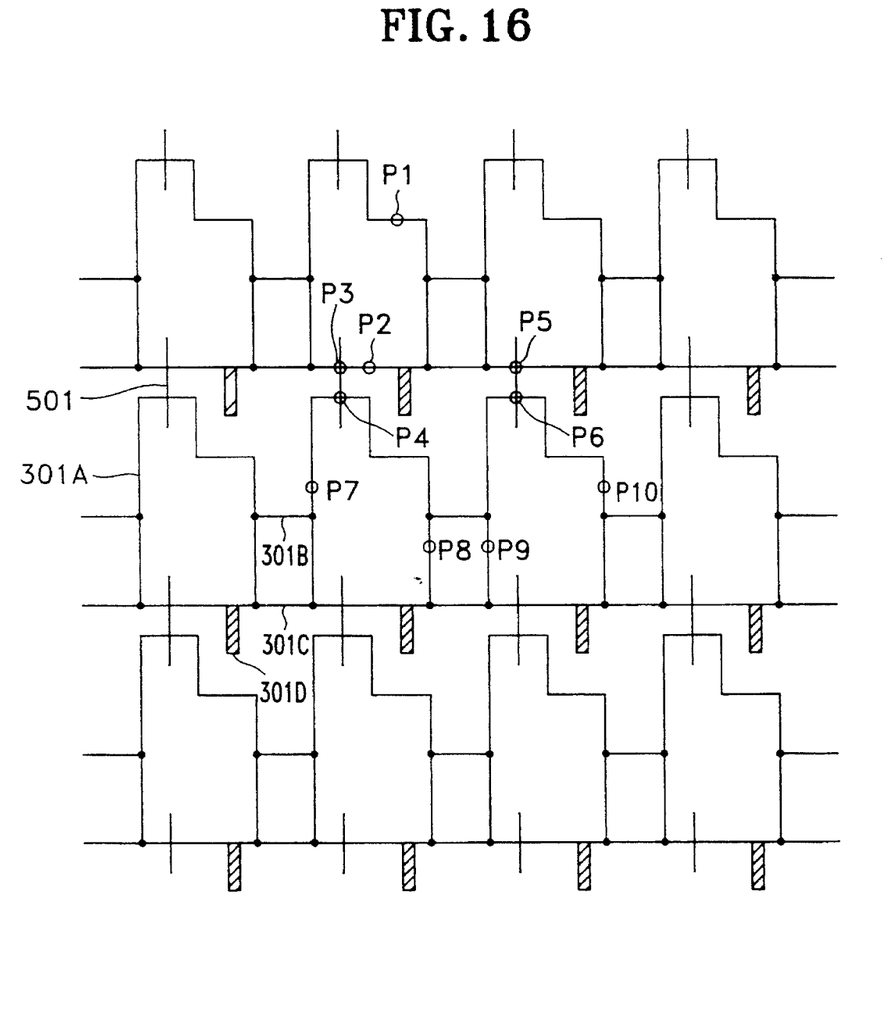

FIG. 16 further illustrates the display device matrix shown in FIG. 13 and particularly illustrates the "repair" property provided by this embodiment of the present invention. Referring to FIG. 16, if a connection failure defect occurs at points P1 and P2, the corresponding scanning line electrodes cannot form a signal transfer path. To remedy this problem the two scanning line electrode repairing conductive layers 501 adjacent to the defect are electrically coupled to the corresponding scanning line electrodes 301 by applying a laser beam to points P3, P4, P5 and P6. Thereafter, the scanning line electrodes having no defect is selected and separated from the defective scanning line electrode by disconnecting the corresponding scanning line repairing conductive layers, portions (P7, P8, P9 and P10) of additional capacitance portion adjacent to connection portions 30LB. Thus, the scanning electrode 301 having no defect is electrically separated into two different signal paths.

Returning to FIG. 14 which is a cross-sectional view taken along line FF' in FIG. 13, and FIG. 15 which is a cross-sectional view taken along line GG' in FIG. 13, the embodiment shown in FIG. 13 will be described in more detail. In FIG. 14, the scanning line electrode repairing conductive layer 501 overlaps the additional capacitance portions 301A of each scanning electrode branch 301.

Semiconductor layer 507 has been previously formed such that it lies below scanning line electrode repairing conductive layer 501 in order to increase the associated insulating property. Semiconductor layer 507 can be formed in the same conventional processing steps that form the semiconductor layers of the transistor which drives the pixels. The scanning line electrode repairing conductive layer 501 can be formed in the same processing step that forms data line electrodes 302. Oxide film 504 is formed on the additional capacitance portions 301A of the scanning electrode branches 301 in order to increase insulating property. Furthermore, an insulating layer 505 such as silicon nitride is formed over oxide film 504. Pixel electrodes 304 are formed on insulating layer 505 and a protective layer 506 is formed over both pixel electrodes 304 and scanning line repairing conductive layer 501.

Figure 15:
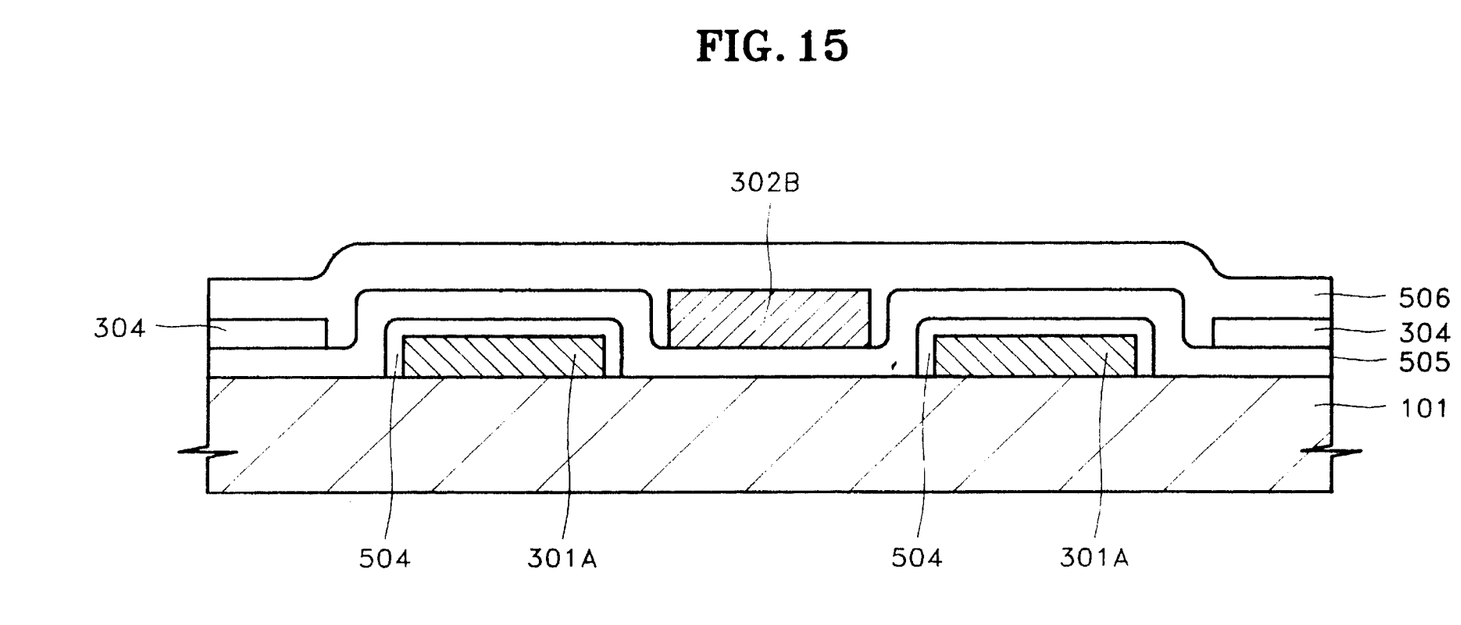
FIG. 15 shows another cross-sectional view taken along line GG' in FIG. 13; and, FIG. 16 shows the display device matrix of FIG. 13 further illustrating the concept of repairing a scanning electrode defect.

Referring to FIG. 15, it is understood that no portion of pixel electrode 304 overlaps additional capacitance portions 301a of the scanning line electrode 301. This is because there are destruction-prevention notches which prevent pixel electrodes 304 from being destroyed when the additional capacitance portions 301A of the scanning line electrodes 301 are disconnected by laser beam in order to repair defects.

Separately from the arrangements for correcting connection failure defects in the scanning line electrodes 301 as shown in FIGS. 10 through 13, a repair ring can be formed around the pixel portion of the LCD to further correct connection failure defects for the data electrodes 302. Generally, since the wiring capacitance of the data line electrodes 302 is small compared to that of the scanning line electrodes 301, the RC time delay produced by the repair ring dies not seriously reduce the image quality.

As described above, the display device matrix according to the present invention increases the matrix yield of an LCD panel without adversely increasing panel size or signal delays. The foregoing embodiments are given by way of example for the purpose of teaching the use and making of the present invention. The present invention is not limited to these embodiments and various changes and modification may be affected by one skilled in the art within the spirit of the invention as defined in the appended claims.

What is claimed is:

1. A display device matrix comprising:

a substrate;

a plurality of signal lines disposed on the substrate in a matrix pattern;

a plurality of bonding pads, each one of the plurality of bonding pads having one end electrically connected to a respective one of the plurality of signal lines, such that an electrical junction is formed between each bonding pad and a respective signal line;

an insulating layer formed over the plurality of signal lines and the plurality of bonding pads; and a plurality of repairing conductive layers formed on first the insulating layer, each one of the plurality of repairing conductive layers being formed over a respective electrical junction, such that a first end portion of the repairing conductive layer overlays a portion of an associated signal line, and another end portion of the repairing conductive layer overlays a portion of an associated bonding pad.

2. The display device claim 1, wherein each bonding pad in the plurality of bonding pads is made of chromium.

3. The display device matrix of claim 1, wherein each signal line in the plurality of signal lines is made of aluminum.

4. The display device of claim 1, wherein each repairing conductive layer in the plurality of repairing conductive layers is made of chromium.

5. The display device of claim 1, wherein at least one of the plurality of repairing conductive layers is electrically connected through a first contact hole in the insulating layer to an associated bonding pad, and the at least one of the plurality of repairing conductive layers is electrically connected through a second contact hole in the insulating layer to an associated signal line.

6. The display device of claim 1, further comprising:

a metal oxide layer formed over a portion of each one of the plurality of signal lines.

7. A display device comprising:

a substrate;

a plurality of signal lines formed on the substrate;

a plurality of bonding pads, wherein each bonding pad is respectively connected to one of the plurality of signal lines to form a plurality of electrical junctions;

a first insulating layer formed over the plurality of signal lines and the plurality of bonding pads;

a plurality of repairing conductive layers formed on the first insulating layer;

wherein each one of the plurality of electrical junctions has an associated repairing conductive layer formed over it, and wherein at least one of the plurality of repairing conductive layer comprises a first end connected through the first insulating layer to an associated bonding pad and a second end connected through the first insulating layer to an associated signal line.

8. The display device of claim 7, further comprising a second insulating layer formed over the substrate, wherein the plurality of signal lines and the plurality of bonding pads are formed on the second insulating layer.

9. A display device comprising:

a substrate;

a signal line having an end portion, and first and second signal path branches extending from the end portion;

a bonding pad overlaying and being electrically connected to end portion of the signal line;

a first insulating layer formed over the signal line and the bonding pad; and a T-shaped repairing conductive layer formed on the first insulating layer and having a tail portion formed over the bonding pad and a head portion formed over the first and second signal path branches.

10. The display device matrix of claim 9, wherein the bonding pad is electrically connected to one the first and second signal path branches through the T-shaped repairing conduction layer.

11. A method of manufacturing a display device, comprising the steps of:

forming a signal line on a substrate;

forming a bonding pad, such that one end of the bonding pad overlays an end of the signal line to form a first electrical connection between the bonding pad and signal line;

forming an insulating layer over the signal line and the bonding pad;

forming a repairing conductive layer on the insulating layer over the first electrical connection;

forming repairing connections through the insulating layer between the bonding pad and the repairing conductive layer, and between the signal line and the repairing conductive layer, such that a second electrical connection between the bonding pad and signal line is made through the repairing conductive layer.

12. The method of claim 11, wherein the step of forming repairing connections through the insulating layer between the bonding pad and the repairing conductive layer, and between the signal line and the repairing conductive layer, comprises the step of:

applying a laser beam to a first selected repair point in the repairing conductive layer, such that a first contact hole is formed through the insulating layer to the bonding pad, wherein a portion of the repairing conductive layer and a portion of the bonding pad are plastically deformed to form the second electrical connection.

13. The method of claim 12, wherein the step of forming repairing connections through the insulating layer between the bonding pad and the repairing conductive layer, and between the signal line and the repairing conductive layer, further comprises the step of:

applying a laser beam to a second selected repair point in the repairing conductive layer, such that a second contact hole is formed through the insulating layer to the signal line, wherein a portion of the repairing conductive layer and a portion of the signal line are plastically deformed to form the second electrical connection.

14. The method of claim 11, further comprising the step of forming a metal oxide layer over a portion of the signal line.

15. The method of claim 14, wherein the step of forming repairing connections through the insulating layer between the bonding pad and the repairing conductive layer, and between the signal line and the repairing conductive layer, comprises the step of:

applying a laser beam to a first selected repair point in the repairing conductive layer, such that a contact hole is formed through the insulating layer to the bonding pad, wherein a portion of the repairing conductive layer and the bonding pad are plastically deformed to form the second electrical connection.

16. The method of claim 15, wherein the step of forming repairing connections through the insulating layer between the bonding pad and the repairing conduction layer, and between the signal line and the repairing conduction layer, further comprises the step of:

applying a laser beam to a second selected repair point in the repairing conductive layer, such that a contact hole is formed through the insulating layer and the metal oxide layer to the signal line, wherein a portion of the repairing conductive layer and the signal line are plastically deformed to form the second electrical connection.

17. A method of manufacturing a display device having a thin film transistor, comprising the steps of:

forming a signal line on a substrate;

forming a bonding pad, such that one end of the bonding pad overlays an end of the signal line to form a first electrical connection between the bonding pad and signal line;

forming an insulating layer over the signal line and the bonding pad;

simultaneously forming a repairing conductive layer and a source/drain electrode for the thin film transistor on the insulating layer, the repairing conductive layer being formed over the first electrical connection;

forming repairing connections through the insulating layer between the bonding pad and the repairing conductive layer, and between the signal line and the repairing conductive layer, such that a second electrical connection between the bonding pad and signal line is made through the repairing conductive layer.

18. The method of claim 17, wherein the insulating layer is a multi-layer structure comprising:

a gate insulating layer formed over the gate of the thin film transistor.

19. The method of claim 18, wherein the insulating layer further comprises a protective layer insulating the source/drain electrode of the thin film transistor.

* * * * *